Figure 1:
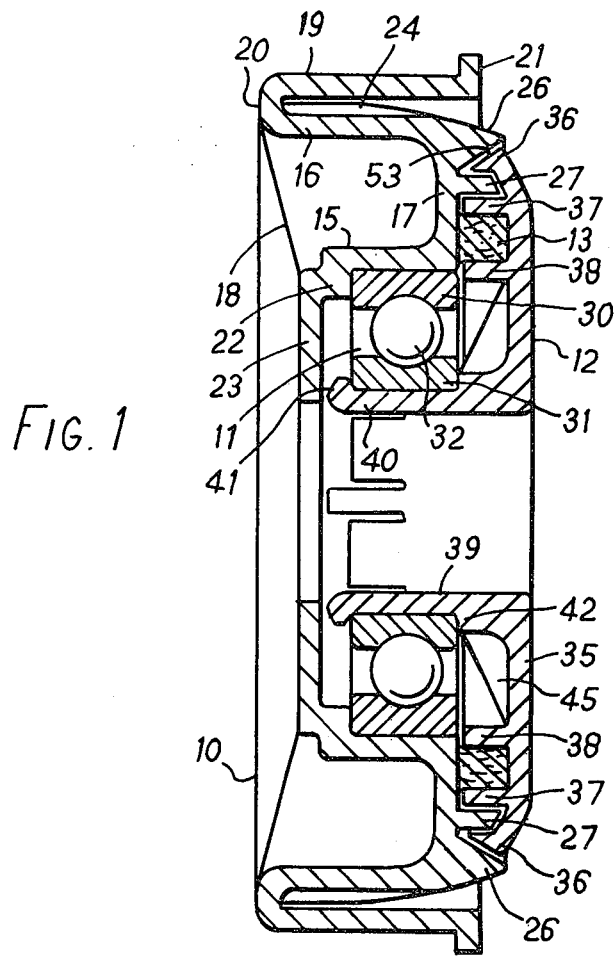

United States Patent [19]

Greener

[11] Patent Number: 4,458,957

[45] Date of Patent: Jul. 10, 1984

[54] LABYRINTH SEALS

[75] Inventor: Brian Greener, Welwyn Garden City, England

[73] Assignee: SKF (U.K.) Limited, Luton, England

[21] Appl. No.: 409,550

[22] Filed: Aug. 19, 1982

Related U.S. Application Data

[63] Continuation of Ser. No. 128,894, Mar. 10, 1980, abandoned.

[30] Foreign Application Priority Data

Mar. 9, 1979 [GB] United Kingdom ............... 7908394
Apr. 23, 1979 [GB] United Kingdom ............... 7914111

[51] Int. Cl.³ .................... F16C 33/80; F16C 33/72
[52] U.S. Cl. .................................. 308/187.1; 277/53
[58] Field of Search ............... 308/187, 187.1, 187.2, 308/189 R; 384/135, 144; 277/53, 55, 56, 57

[56] References Cited

U.S. PATENT DOCUMENTS 3,610,387 10/1971 Von Stein ............... 193/37
3,957,147 5/1976 Specht ............... 308/187.1 X Primary Examiner—Stuart S. Levy
Assistant Examiner—Thomas R. Hannon
Attorney, Agent, or Firm—Browdy and Neimark

[57] ABSTRACT

A bearing assembly has two relatively rotatable members formed with annular tongues which are interleaved to form a labyrinth passageway seal between the two members. At least a portion of the passageway is defined by frusto conical surfaces on the annular tongues arranged to exert centrifugal force on any foreign matter in the passageway upon relative rotation between the two members so as to urge the foreign matter towards the outer end of the passageway. The labyrinth passageway may comprise portions which are flared in the direction towards the outer end of the passageway, and the annular tongues on one of the members arranged eccentric or non-circular so that the two members exert a pumping action on any foreign matter in the flared portions of the labyrinth passageway upon relative rotation between the two members.

8 Claims, 12 Drawing Figures

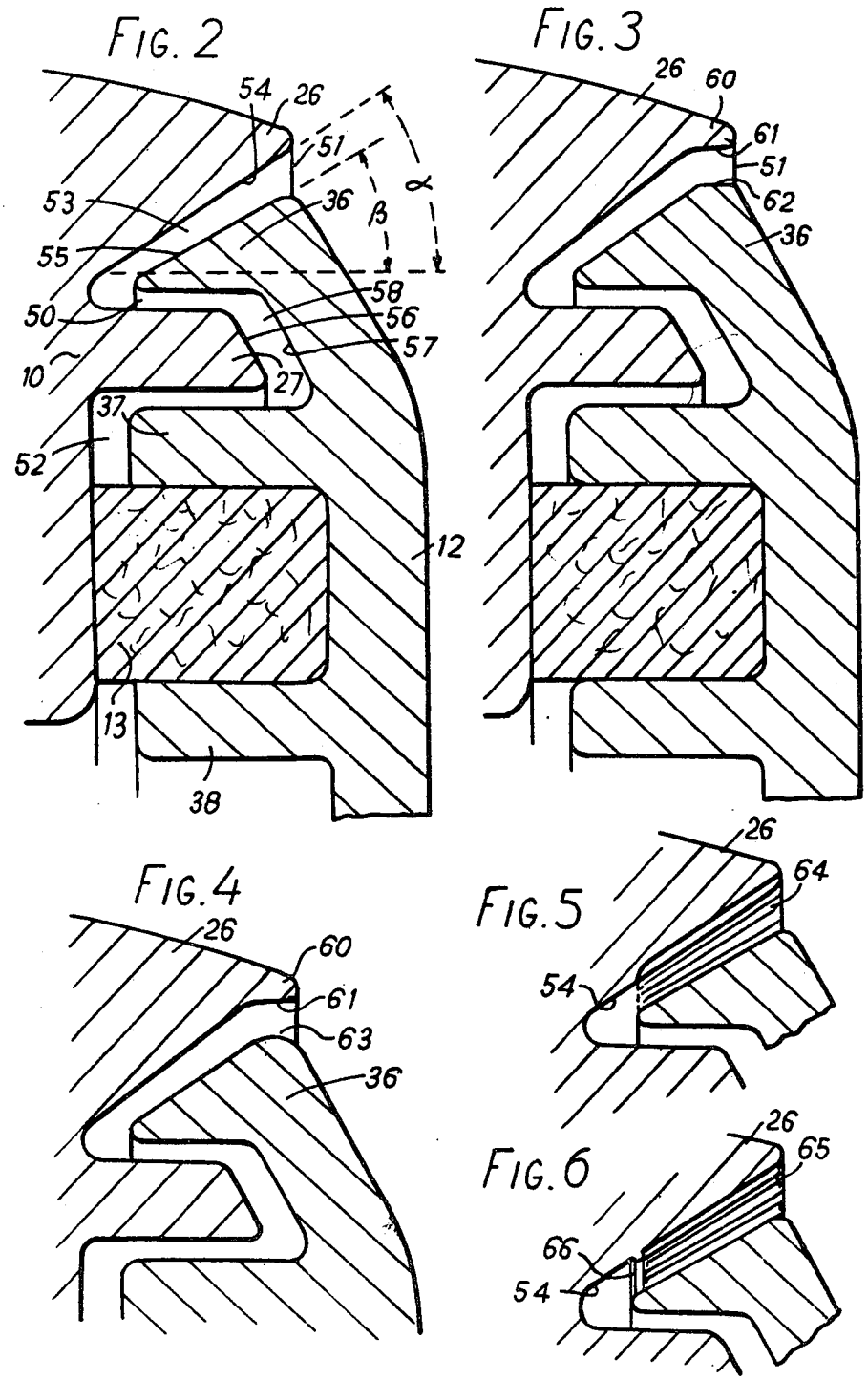

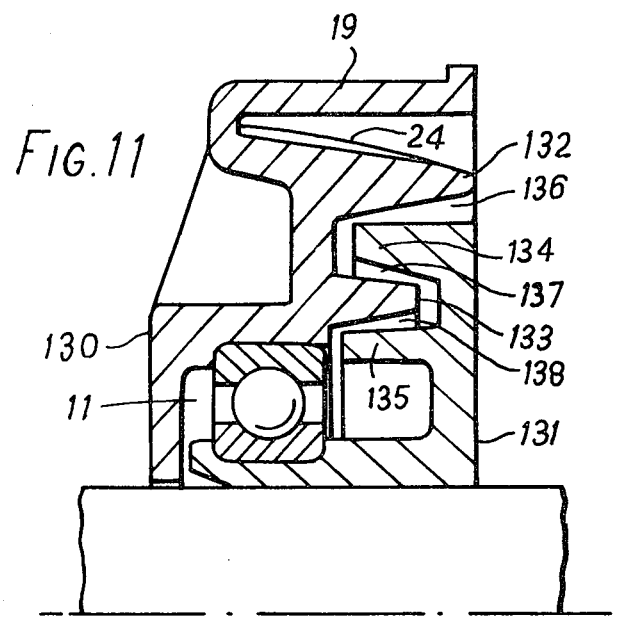
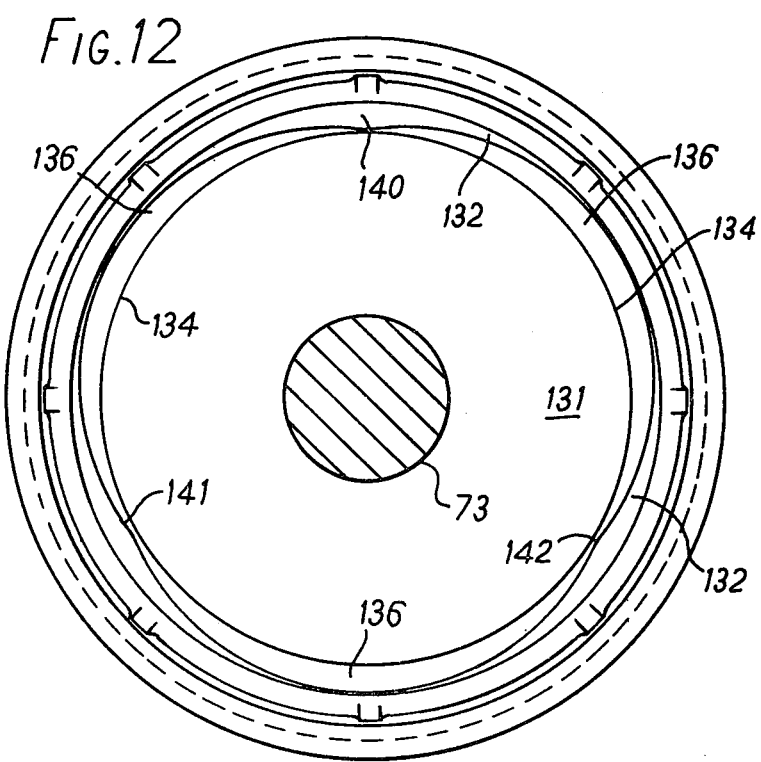

LABYRINTH SEALS

This is a continuation of application Ser. No. 128,894, filed Mar. 10, 1980, now abandoned.

This invention relates to a labyrinth seal for bearing means permitting relative rotation between two components of an apparatus, the labyrinth seal comprising two members mounted one on each of the two components and co-operating with one another to form an annular labyrinth passageway having an inner end leading to the annular space between the two components accommodating the bearing means and an outer end leading to the exterior of the apparatus.

In prior known labyrinth seals of this kind, the two co-operating members are generally formed with annular co-axial tongues of rectangular section which are interleaved with one another to form an annular passageway of stepped formation, each step consisting of an axially extending portion and a radially extending portion. In the operation of such seals, it occassionally happens that foreign matter which enters the outer end of the passageway is drawn further into the passageway upon relative rotation between the two members. It is known from French specification No. 1012107 to provide a labyrinth seal in which a portion of the passageway is defined by surfaces which are frusto-conical and extend radially outwards in the direction along the labyrinth passageway leading to the outer end thereof, whereby any foreign matter circulating around the frusto-conical portion of the labyrinth passageway upon relative rotation between the two members will be urged by centrifugal force towards the outer end of the passageway. The centrifugal force is however sometimes insufficient to prevent foreign matter being drawn further into the passageway upon relative rotation between the two members of the seal.

The present invention arose from the discovery that the phenomena of foreign matter being drawn further into the labyrinth passageway occurred when the walls of the passageway diverged slightly in the direction away from the outer end of the passageway, due possibly to a slight tilting of one or both of the members of the seal due to deflection of a supporting shaft under load, or due to accumulation of tolerance errors in manufacture. This phenomena did not however occur in many other seals of the same construction in which the walls of the passageway diverged from one another in the direction away from the outer end of the passageway. It is believed that the reason why foreign matter is drawn into the labyrinth passageway when the walls diverge in a direction leading away from the outer end is that the tongues of a labyrinth seal are not always exactly co-axial, due to manufacturing tolerances, and that any such eccentricity, combined with diverging walls in a direction away from the outer end of the passageway, cause the labyrinth seal to act in effect as a positive displacement pump drawing foreign matter along the passageway away from the outer end thereof.

The present invention consists in so designing the labyrinth seal that, upon relative rotation between the seal members, at least part of the labyrinth passageway acts as a centrifugal pump which drives any foreign matter along the passageway in the direction of the outer end of the passageway, despite any slight tilting of the seal members due to deflection of the supporting shaft.

Thus according to the invention there is provided in an apparatus including bearing means permitting relative rotation between two components of the apparatus about an axis of one of the components, said components defining an annular space accommodating said bearing means, a device for providing a labyrinth seal for said annular space comprising two annular members mounted one on each of said components, said members having annular tongues which are interleaved to define a narrow annular tortuous labyrinth passageway between the members along the entire length of the labyrinth passageway, said passageway having an inner end leading to said annular space and an outer end leading to the exterior of the apparatus, wherein at least one tongue on each member has a frusto-conical surface and at least one portion of the labyrinth passageway is defined by said frusto-conical surfaces, said frusto-conical surfaces extending radially outwards in the direction along the passageway leading to said outer end thereof, whereby any foreign matter circulating around said one portion of the passageway upon relative rotation between the members will be urged by centrifugal force towards said outer end of the passageway, and the radially outer one of said frusto-conical surfaces forming said one portion of the labyrinth passageway is inclined relative to said axis at a greater angle than that of the radially inner one of said frusto-conical surfaces forming said one portion of the labyrinth passageway relative to said axis so that said one portion is flared radially outwards.

The difference between the two angles should be such that there is little or no risk of the surfaces of the flared portion of the passageway diverging in a direction leading away from the outer end of the passageway in the event of deflection of a shaft supporting one of the members under load, or due to an accumulation of manufacturing tolerances.

The labyrinth passageway may comprise a series of flared portions extending radially outwards in the direction leading to the outer end of the passageway.

The device of the invention may comprise annular tongues which are spaced from one another in the axial direction, in which case the outer end of the passageway is the axially outer end remote from the components being sealed, or the annular tongues may be spaced from one another in the radial direction, in which case the outer end of the passageway is the radially outer end.

It is known from French specification No. 1230578 to provide a conveyor roller having a labyrinth seal formed by two members having interleaved tongues, in which the labyrinth passageway has flared portions diverging in the direction towards the mouth of the passageway. The flared portions of the passageway are however not for the purpose of avoiding any diverging of the walls from the mouth in the event of tilting of the seal members when the shaft is under load, but for the purpose of obtaining a rubbing seal between the tongues when the two seal members are moved towards one another.

The device according to the invention may be arranged so that the frusto-conical surfaces defining the flared portion of the labyrinth passageway are circular in cross section normal to the axis of the seal with one frusto-conical surface eccentric relative to the other frusto-conical surface, whereby the two surfaces form a positive displacement pump operable upon relative rotation between the members to pump foreign matter in the flared portion along the passageway in the direction leading to the outer end of the passageway. The foreign matter would of course also be subjected to centrifugal force due to circulation movement around the flared portion.

Alternatively the device according to the invention may be arranged so that one of the frusto-conical surfaces defining the flared portion of the labyrinth passageway is circular in cross section normal to the axis of the seal and the other frusto-conical surface is non-circular in cross section normal to said axis, whereby the two surfaces form a positive displacement pump operable upon relative rotation between the members to pump foreign matter in the flared portion along the passageway in the direction leading to the outer end of the passageway. The foreign matter will also be subjected to centrifugal force due to circulation movement around the flared portion.

The labyrinth seal of the invention is particularly suitable for sealing the bearings in end cap assemblies for conveyor rollers which in operation may frequently be subjected to dust, dirt and water.

Figure 7:
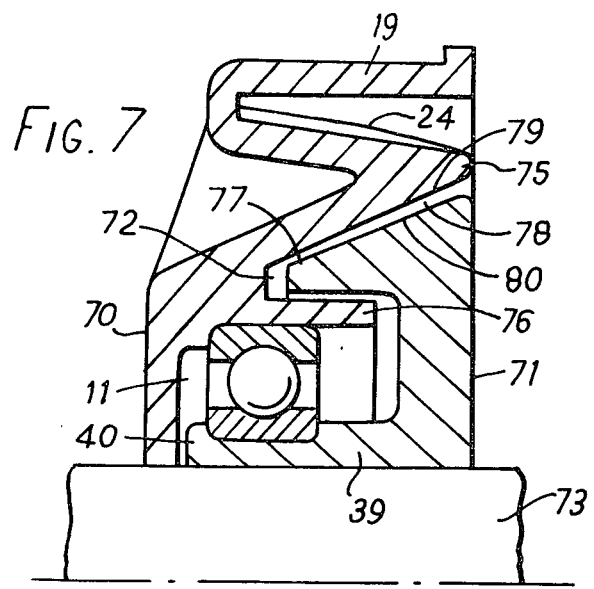
Figure 8:
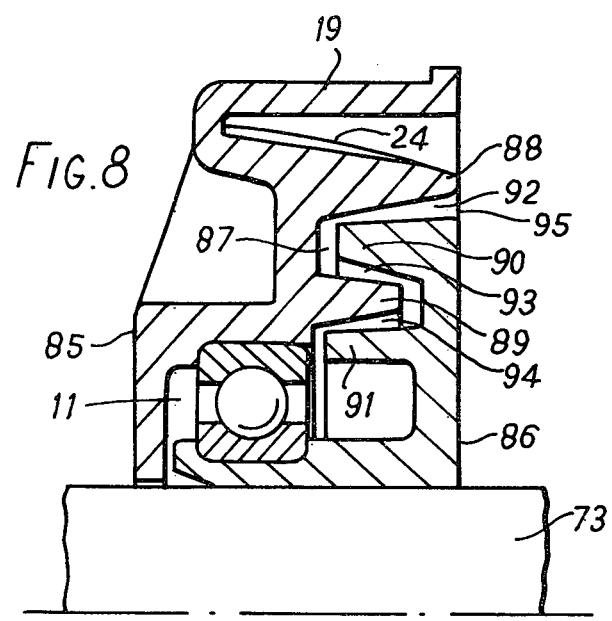
Figure 9:
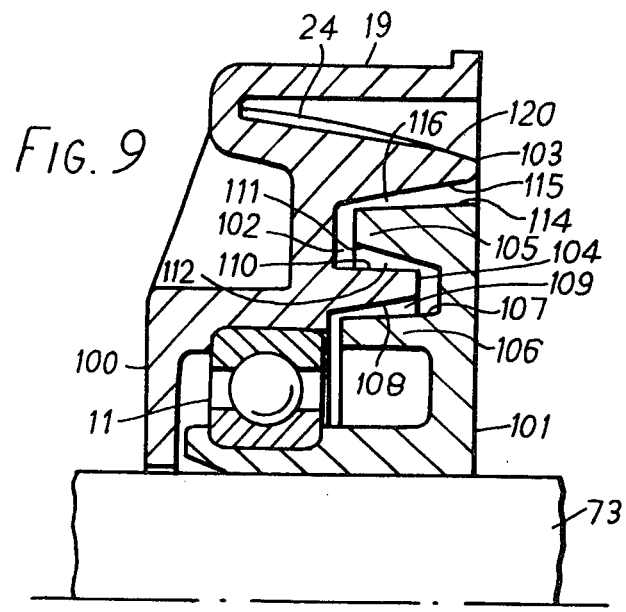
Figure 10:
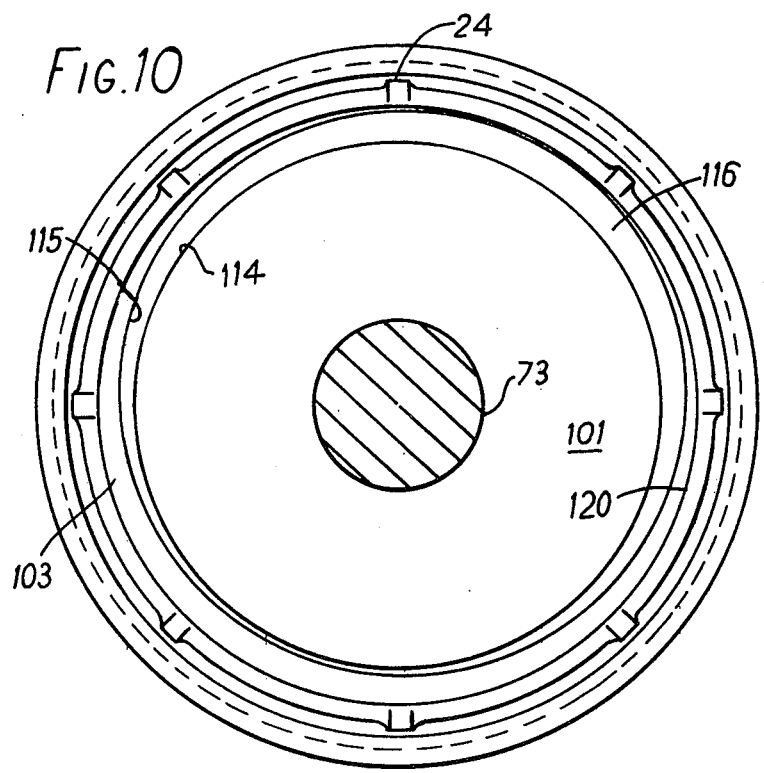

Different constructions of labyrinth seals according to the invention, incorporated in end cap bearing assemblies for conveyor rollers, will now be described, by way of example, with reference to the accompanying drawings, in which:

FIG. 1 is a cross sectional side elevation of an end cap bearing assembly having a labyrinth seal adapted to throw out foreign matter by centrifugal force, and a felt seal closing the inner end of the labyrinth seal, FIG. 2 is a cross sectional side elevation of the seals of FIG. 1 shown on a larger scale, FIG. 3 is a view similar to FIG. 2 showing a modified construction of the labyrinth seal, FIGS. 4, 5, 6 show modified constructions of the labyrinth seal of FIG. 2, FIG. 7 is a cross sectional side elevation of an end cap bearing assembly for a conveyor roller, incorporating another construction of labyrinth seal adapted to throw out foreign matter by centrifugal force, FIG. 8 is a cross sectional side elevation of an end cap bearing assembly incorporating yet another construction of labyrinth seal adapted to throw out foreign matter by centrifugal force, FIG. 9 is a cross sectional side elevation of an end cap bearing assembly incorporating a labyrinth seal adapted to operate as a positive displacement pump to eject foreign matter, FIG. 10 is an end elevation view of the end cap bearing assembly of FIG. 9, FIG. 11 is a cross sectional side elevation of an end cap bearing assembly incorporating another construction of labyrinth seal adapted to operate as a positive displacement pump to eject foreign matter, and FIG. 12 is an end elevation view of the end cap bearing assembly of FIG. 11.

The end cap assembly shown in FIG. 1 comprises a housing 10 fitted with a ball bearing 11, an end cover 12 engaged as a snap fit in the bore of the bearing, and an annular felt seal 13 compressed between the housing and the end cover.

The housing 10 is made of a resilient plastics material, preferably glass fibre reinforced nylon, and comprises a cylindrical inner wall 15, a cylindrical outer wall 16 surrounding the inner wall 15, an end wall 17 integral with adjacent ends of the walls 15, 16, and a plurality of radial webs 18 spaced around the housing and extending between the inner and outer walls 15, 16, the webs 18 being integral with the walls 15, 16, 17. A cylindrical sleeve 19 surrounds the wall 16 and is connected thereto at the end remote from the end wall 17 by an annular bight portion 20 of U-shaped cross section, to form a spring support for the end cap assembly. The end of the sleeve 19 remote from the bight portion 20 is formed with a radial flange 21. The end of the cylindrical inner wall 15 remote from the wall 17 is formed with an annular step 22 forming an abutment for the bearing 11, and a further end wall 23 integral with the step 22 extends radially inwards.

The outside surface of the outer wall 16 of the housing is formed with a plurality of axially extending ribs 24 spaced around the housing, each rib being radially aligned with one of the radial webs 18 and being curved radially inwards in the axial direction away from the bight portion 20. The end wall 17 is formed with two concentric annular tongues 26, 27 on the side remote from the webs 18.

The ball bearing 11 comprises an outer bearing ring 30, an inner bearing ring 31 and balls 32 in rolling engagement with grooved tracks on the rings 30, 31 so that the bearing is capable of resisting radial forces and axial forces in both directions. The outer ring 30 is a tight fit against the inside surface of the cylindrical wall 15 and abuts against the step 22.

The end cover 12 is also made of resilient plastics material, preferably unfilled nylon, and comprises an annular disc 35 formed on one side with three concentric annular tongues 36, 37, 38 and a cylindrical flange 39 at the centre of the disc 35. The free end of flange 39 is split axially and formed into four resilient fingers 40 having enlarged ends 41 which extend through the bore of the inner bearing ring 31 and engage as a snap fit on the chamfer thereof, and the centre portion of the flange 39 is formed with an annular step 42 which abuts against the adjacent face of the inner bearing ring when the enlarged ends on the fingers engage the opposite side of the inner bearing ring, thereby axially locating the end cover relative to the bearing and the housing 10. The radially outer tongue 36 on the cover projects between the tongues 26, 27 on the housing, and the tongue 37 on the cover is spaced close to the tongue 27 on the housing, so as to provide a labyrinth seal between the housing and the cover, as described more fully hereinafter.

The annular felt seal 13 is mounted as a close fit in the annular recess formed between the tongues 37, 38 on the cover, and has an axial width such that it is compressed between the cover and the housing so as to be in rubbing contact with the end wall 17 of the housing upon rotation of the housing relative to the cover. The annular recess 45 between the tongue 38 and the cylindrical flange 39 on the cover is filled with grease for lubricating the bearing, the seal 13 preventing escape of the grease through the labyrinth.

The end cap assembly is designed for use with a cylindrical steel roller tube having an internal diameter such that the sleeve 19 of the end cap assembly is a hand push-fit within the roller tube. The end cap assembly is secured in position in the end of the roller tube, with the flange 21 abutting the end of the tube, by swaging the end of the roller tube radially inwards, that is reducing the diameter of the end of the roller tube by external pressure, so as to force the sleeve 19 against the ribs 24 on the housing as shown in FIG. 4. The walls 15, 16, 17 and the radial webs 18 form a substantially rigid frame which resists deformation under the swaging pressure applied to the roller tube.

In use, the end cap assembly, fitted in a roller tube, is mounted on a shaft fixed in the frame of a conveyor, the shaft being a close sliding fit in the bore of the cylindrical flange 39 on the end cover. The end cover thus remains stationary and upon rotation of the roller tube the housing of the end cap assembly rotates with the roller tube relative to the end cover.

The labyrinth seal between the housing and the end cover is shown more clearly on a larger scale in FIG. 2 which shows the annular tongues 26, 27 on the housing interleaved with the annular tongues 36, 37 on the end cover to form a narrow tortuous annular passageway 50, the radially outer end 51 of which is open and the radially inner end 52 of which is closed by the felt seal 13. The radially outer portion 53 of the passageway 50 adjacent the open end 51 is defined by a frusto-conical surface 54 on the tongue 26 and a frusto-conical surface 55 on the tongue 36, so that the radially outer portion 53 is flared radially and axially outwards relative to the axis of the end cap assembly.

In use, any foreign matter which enters the narrow passageway 50 through the open end 51 will normally come in contact with the wall of the passageway defined by the housing 10 and, upon rotation of the housing, the frictional resistance between the foreign matter and the housing will cause the foreign matter to circulate around the annular passageway 50. Since however the portion 53 of the passageway adjacent the open end 51 is flared outwards, the foreign matter circulating around the portion 53 will be urged by centrifugal force towards the open end 51. The angle α between the frusto-conical surface 54 and the rotational axis of the housing is preferably large enough to ensure that foreign matter in the flared portion 53 will slide along the frusto-conical surface 54 and be discharged through the open end 51, that is the tangent of the angle should be greater than the maximum possible coefficient of friction of any foreign matter likely to enter the passageway 50.

It is essential that the frusto-conical surfaces 54, 55 do not converge towards one another in the direction towards the open end 51 of the passageway, since otherwise any foreign matter entering the passageway may be forced further into the passageway against the centrifugal force provided by the flared portion 53. This could arise, even though the surfaces 54, 55 are nominally at the same angle relative to the axis of the housing and end cover, due to deflection of the shaft supporting the end cover or due to overlap of manufacturing tolerances. To ensure that the width of the open end 51 is not smaller than that of the remainder of the flared portion 53 angle between the frusto-conical surface 54 and the axis of the housing is greater than the angle between the frusto-conical surface 55 and the axis of the end cover, so that the surfaces 54, 55 diverge away from each other in the direction towards the open end 51 of the passageway as shown in FIG. 2. The angle α may for example be 2° larger than the angle.

The end of the tongue 27 is also provided with a frusto-conical surface 56 which co-operates with a frusto-conical surface 57 on the tongue 36 to provide another portion 58 of the annular passageway which is flared radially outwards and will exert a centrifugal force on any foreign matter circulating around the portion 58 due to frictional resistance between the foreign matter and the surface 56 on the housing upon rotation of the housing. The centrifugal force on foreign matter in portion 58 will urge the matter in the direction leading to the portion 53 in which the foreign matter will be thrown to the open end 51 as described above.

The outer tongue 26 on the housing may be provided with an axial flange 60 defining a cylindrical outer surface 61 at the open end 51 of the passageway. This construction has the advantage that the flange 60 shrouds the open end of the passageway 50, particularly when the end cap assembly is operating with its axis horizontal. The radially inner wall of the open end 51 of the passageway may then be formed with a cylindrical surface 62 on the tongue 36 of the end cover as shown in FIG. 3, or by a curved surface 63 on the tongue 36 as shown in FIG. 4.

The frusto-conical surface 54 on the outer tongue 26 of the housing may be provided with longitudinal grooves 64, that is grooves extending in the axial direction, as shown in FIG. 5. The end of each groove remote from the open end 51 of the labyrinth passageway is closed by a step between the base of the groove and the surface 54, and the end of each groove adjacent the open end 51 is chamfered to permit free flow of any material out of the groove when subjected to centrifugal force upon rotation of the housing. Alternatively, the surface 54 may be provided with longitudinal ridges 65 and a circumferential rib 66 closing off the radially inner ends of the channels formed between the ridges, as shown in FIG. 6. Such grooves 64 or ridges 65 increase the tangential coefficient of friction between foreign matter and the tongue 26 on the housing without increasing the axial coefficient of friction values. The result of increasing the tangential coefficient of friction in the rotational direction is to ensure that any foreign matter will rotate with the rotating housing which will then, by centrifugal force, throw the foreign material out of the labyrinth passageway. The grooves or ridges are of course only applied to the rotating member of the labyrinth seal.

The end cap bearing assembly of FIG. 7 comprises a housing 70 fitted with a ball bearing 11, and an end cover 71 which co-operates with the housing to form an annular labyrinth passageway 72 therebetween. The housing and end cover have features common to that of the housing and end cover of FIG. 1 and like parts are identified by like reference numerals in the two Figures.

The housing 70 of FIG. 7 is provided with a cylindrical sleeve 19 identical to that of the end cap assembly of FIG. 1 to enable the housing to be mounted in a cylindrical steel roller tube as described above. The end cover 71 is provided with a cylindrical flange 39 split into resilient fingers 40 engaged as a snap fit in the bore of the bearing in a manner already described in connection with FIG. 1. The end cover is supported on a shaft 73 engaged as a close sliding fit in the bore of the cylindrical flange 39.

The housing 70 is shaped to form two annular tongues 75, 76 and the end cover 71 is shaped to form a single annular tongue 77 which engages between the two tongues 75, 76 and co-operates therewith to form the annular labyrinth passageway 72. The radially outer portion 78 of the passageway is defined by a frusto-conical surface 79 on the tongue 75 and a frusto-conical surface 80 on the tongue 77, so that the portion 78 is flared radially and axially outwards so as to exert a centrifugal force on foreign matter circulating around the portion 78 upon rotation of the housing. The end cap assembly of FIG. 7 has the advantage over that of FIG. 1 in that the flared outer portion 78 in FIG. 7 is of greater length than the flared portion 53 of FIG. 1.

The end cap bearing assembly of FIG. 8 comprises a housing 85 fitted with a ball bearing 11, and an end cover 86 which co-operates with the housing to form an annular labyrinth passageway 87 between two annular tongues 88, 89 on the housing interleaved with two annular tongues 90, 91 on the end cover. The annular tongues 88-91 have frusto-conical flanks and are arranged so that the three portions 92, 93, 94 of the passageway formed between the flanks of the annular tongues are each flared radially outwards in the direction of the passageway leading towards the radially outer end 95 thereof. In use, upon rotation of the housing 85, any foreign matter in the flared portions 92, 93, 94 will be circulated around the associated flared portion due to the frictional resistance with the housing, and will be urged radially outwards by centrifugal force. Any foreign matter in portion 94 will thus be forced into portion 93, the foreign matter in portion 93 will be forced into portion 92, and the foreign matter in portion 92 will be thrown out of the open end 95 by centrifugal force.

The end cap bearing assembly of FIGS. 9 and 10 comprises a housing 100 fitted with a ball bearing 11, and an end cover 101 which co-operates to form an annular labyrinth passageway 102 between two annular tongues 103, 104 on the housing interleaved with two annular tongues 105, 106 on the end cover. The tongue 106 has a cylindrical surface 107 which co-operates with a frusto-conical surface 108 on the tongue 104 to form a portion 109 of the passageway in which the walls diverge in a direction leading towards the outer end of the passageway. Similarly the tongue 104 has a cylindrical surface 110 which co-operates with a frusto-conical surface 111 on the tongue 105 to form a portion 112 of the passageway in which the walls diverge in the direction towards the outer end of the passageway. Also, the tongue 105 has a cylindrical surface 114 which co-operates with the frusto-conical surface 115 on tongue 103 to form a portion 116 of the passageway in which the walls diverge in a direction leading towards the outer end of the passageway. All the tongues 103-106 are of circular section in a plane normal to the axis of the shaft 73, and the tongues 105, 106 on the end cover are concentric with the axis of the shaft. The tongues 103, 104 are however eccentric with respect to the axis of the shaft so that upon rotation of the housing any foreign matter in the portions 109, 112, 116 is squeezed between the diverging walls and forced along the passageway in the direction leading to the open outer end of the passageway. The radially outer surface 120 of the tongue 103 on the housing will of course be concentric with respect to the shaft 73 since this surface supports the end of the flange 19 when the flange and the end of a roller tube are swaged onto the housing.

The end cap bearing assembly of FIGS. 11 and 12 comprises a housing 130 fitted with a ball bearing 11, and an end cover 131 which co-operates with housing 130 to form an annular labyrinth passageway between two annular tongues 132, 133 on the housing interleaved with two annular tongues 134, 135 on the end cover. As in the arrangement of FIG. 9 the tongues define three portions 136, 137, 138 of the labyrinth passageway having walls which diverge in the direction leading to the outer end of the passageway. The tongues 132-135 are all concentric with respect to the axis of the shaft 73, and the tongues 134, 135 on the end cover are of circular section in the plane normal to the axis of the shaft. The tongues 132, 133 are however non-circular and the surfaces thereof defining the walls of portions 136, 137, 138 are each provided with three lobes spaced close to the opposing surface on the tongues 134, 135. Only the lobes 140, 141 on the tongue 132 are shown in FIG. 12. Upon rotation of the housing, the lobes on the tongues 132, 133 squeeze any foreign matter against the opposing walls on the end cover and thereby force the foreign matter along the diverging walls of the associated portion of the passageway in the direction leading to the open outer end of the passageway.

In the end cap bearing assembly of FIG. 8, the tongues on the housing may be arranged eccentric with respect to the tongues on the end cover as in the arrangement of FIGS. 9 and 10 so that foreign matter in the labyrinth passageway is urged towards the outer end of the passageway by both centrifugal force and the squeezing action due to the eccentric movement of the tongues on the housing.

Alternatively, in the end cap bearing assembly of FIG. 8, the tongues on the housing may be non-circular and provided with lobes in close proximity to the tongues on the end cover as in the arrangement of FIGS. 11 and 12 so that foreign matter in the labyrinth passageway is urged towards the outer end of the passageway by both centrifugal force and the squeezing action between the diverging walls of the relevant portion of the passageway.

I claim:

1. In an apparatus including bearing means permitting relative rotation between two components of the apparatus about an axis of one of the components, said components defining an annular space accommodating said bearing means, a device for providing a labyrinth seal for said annular space comprising two annular members mounted one on each of said components, said members having annular tongues which are interleaved to define a narrow annular tortuous labyrinth passageway between the members along the entire length of the labyrinth passageway, said passageway having an inner end leading to said annular space and an outer end leading to the exterior of the apparatus, at least one tongue on each member having a frusto-conical surface, at least one portion of the labyrinth passageway being defined by said frusto-conical surfaces, and said frusto-conical surfaces extending radially outwards in the direction along the passageway leading to said outer end thereof whereby any foreign matter circulating around said one portion of the passageway upon relative rotation between the members will be urged by centrifugal force towards said outer end of the passageway, said device having the improvement: the radially outer one of said frusto-conical surfaces forming said one portion of the labyrinth passageway is inclined relative to said axis at a greater angle than that of the radially inner one of said frusto-conical surfaces relative to said axis, so that said inner and outer frusto-conical surfaces diverge away from one another in the direction leading to the outer end of the passageway whereby any foreign matter does not become trapped between the frusto-conical surfaces, irrespective of any slight tilting of one or both of said members.

2. In an apparatus including bearing means permitting relative rotation between a shaft and a component of the apparatus about the axis of said shaft, said bearing means comprising an inner bearing ring, an outer bearing ring, and rolling elements between the two bearing rings, the shaft and said component defining an annular space at one side of the bearing means, a device incorporating said bearing means and providing a labyrinth seal for said annular space, said device comprising a first annular member mounted on said shaft and supporting the inner bearing ring of said bearing means, and a second annular member mounted on said component and supporting the outer bearing ring of said bearing means, said members having annular tongues which are interleaved to define a narrow annular tortuous labyrinth passageway between the members along the entire length of the labyrinth passageway, said passageway having an inner end leading to said annular space and an outer end leading to the exterior of the apparatus, at least one tongue on each member having a frusto-conical surface, at least one portion of said labyrinth passageway being defined by the frusto-conical surfaces, and said frusto-conical surfaces extending radially outwards in the direction along the passageway leading to said outer end thereof whereby any foreign matter circulating around said one portion of the passageway upon relative rotation between the members will be urged by centrifugal force towards the outer end of the passageway, said device having the improvement: the radially outer one of said frusto-conical surfaces forming said one portion of the labyrinth passageway is inclined relative to the axis of the shaft at a greater angle than that of the radially inner one of said frusto-conical surfaces relative to said axis, so that said inner and outer frusto-conical surfaces diverge away from one another in the direction leading to the outer end of the passageway whereby any foreign matter does not become trapped between the frusto-conical surfaces, irrespective of any slight tilting of one or both of said members.

3. A device as claimed in claim 1 or 2, wherein the part of the apparatus which supports the member defining the radially outer one of said frusto-conical surfaces of said one portion of the labyrinth passageway is rotatable and the part of the apparatus which supports the other of said members is fixed.

4. A device as claimed in claim 1 or 2, wherein the frusto-conical surfaces defining said one portion of the labyrinth passageway are circular in cross section normal to said axis, with one frusto-conical surface eccentric relative to the other frusto-conical surface, whereby the two members form a positive displacement pump operable upon relative rotation between the members to pump foreign matter in said one portion along the labyrinth passageway in the direction leading to the outer end thereof, the foreign matter also being subjected to centrifugal force due to circulation movement around said one portion of the labyrinth passageway.

5. A device as claimed in claim 1 or 2, wherein one of the frusto-conical surfaces defining said one portion of the labyrinth passageway is circular in cross section normal to said axis and the other frusto-conical surface of said one portion is non-circular in cross section normal to the axis of said shaft, whereby the two members form a positive displacement pump operable upon relative rotation between the members to pump foreign matter in said one portion along the passageway in the direction leading to the outer end thereof, the foreign matter also being subjected to centrifugal force due to circulation movement around said one portion of the labyrinth passageway.

6. A device as claimed in claim 1 or 2, wherein one of the frusto-conical surfaces defining said one portion of the labyrinth passageway is circular in cross section normal to said axis and the other frusto-conical surface of said one portion has a plurality of longitudinal lobes spaced symmetrically around the frusto-conical surface and in close proximity to the other frusto-conical surface, whereby the two members form a positive displacement pump operable upon relative rotation between the members to pump foreign matter in said one portion along the passageway in the direction leading to the outer end thereof, the foreign matter also being subjected to centrifugal force due to circulation movement around said one portion of the labyrinth passageway.

7. A device as claimed in claim 1 or 2, wherein said members define an annular compartment at the inner end of said labyrinth passageway, and an annular seal of resilient material is mounted inside said compartment and compressed between said members so as to close the radially inner end of said labyrinth passageway.

8. In an apparatus including bearing means permitting relative rotation between two components of the apparatus about an axis of one of the components, said components defining an annular space accommodating said bearing means, a device for providing a labyrinth seal for said annular space comprising two annular members mounted one on each of said components, said members having annular tongues which are interleaved to define a narrow annular tortuous labyrinth passageway between the members along the entire length of the labyrinth passageway, said passageway having an inner end leading to said annular space and an outer end leading to the exterior of the apparatus, the tongues on the two members having frusto-conical surfaces which extend radially outwards in the direction along the passageway leading to the outer end thereof, and the labyrinth passageway having at least two successive annular portions each of which is formed by two of said frusto-conical surfaces, said device having the improvement: the radially outer one of the two frusto-conical surfaces forming each of said portions of the labyrinth passageway is inclined relative to said axis at a greater angle than that of the radially inner one of said two frusto-conical surfaces so that in each of said portions said inner and outer frusto-conical surfaces diverge away from one another in the direction leading to the outer end of the passageway.

* * * * *